United States Patent
Wolf

(10) Patent No.: US 8,474,557 B2
(45) Date of Patent: Jul. 2, 2013

(54) AIR GUIDING DEVICE

(75) Inventor: Thomas Wolf, Riedstadt (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 20 days.

(21) Appl. No.: 13/233,711

(22) Filed: Sep. 15, 2011

(65) Prior Publication Data

US 2012/0068498 A1  Mar. 22, 2012

(30) Foreign Application Priority Data

Sep. 17, 2010  (DE) .......................... 10 2010 037 617

(51) Int. Cl.
*B60K 13/02* (2006.01)

(52) U.S. Cl.
USPC ........... 180/68.2; 180/68.1; 180/68.4; 454/69

(58) Field of Classification Search
USPC ............... 180/68.1, 68.2, 68.4, 68.6; 454/69, 454/162

See application file for complete search history.

(56) References Cited

U.S. PATENT DOCUMENTS

| | | | | |
|---|---|---|---|---|
| 4,653,788 A * | 3/1987 | Di Giusto | ..................... | 293/117 |
| 4,723,594 A * | 2/1988 | Koehr et al. | ..................... | 165/44 |
| 4,772,299 A * | 9/1988 | Bogusz | ..................... | 55/385.3 |
| 4,805,747 A | 2/1989 | Moedinger | | |
| 4,810,021 A | 3/1989 | Burst | | |
| 5,923,245 A | 7/1999 | Klatt | | |
| 6,315,091 B1 * | 11/2001 | Nilsen et al. | ..................... | 188/264 A |
| 7,055,638 B2 * | 6/2006 | Khalighi et al. | ..................... | 180/116 |
| 7,886,859 B2 * | 2/2011 | Caldirola | ..................... | 180/68.2 |
| 8,297,685 B2 * | 10/2012 | Wolf et al. | ..................... | 296/180.3 |
| 2007/0023238 A1 * | 2/2007 | Ramsay et al. | ..................... | 188/71.6 |
| 2011/0308763 A1 * | 12/2011 | Charnesky et al. | ..................... | 165/41 |

FOREIGN PATENT DOCUMENTS

DE  37 11 682  9/1988
DE  101 59 783  6/2003

* cited by examiner

*Primary Examiner* — John Walters
*Assistant Examiner* — Brian Swenson
(74) *Attorney, Agent, or Firm* — Gerald E. Hespos; Michael J. Porco; Matthew T. Hespos

(57) ABSTRACT

An air guiding device is arranged in a front end part of a motor vehicle and has an air guiding duct containing a radiator unit through which fresh air flows. A wheel house grille is arranged in the guiding duct downstream of the radiator unit. The wheel house grille has differently positioned air guiding slats for the passage of radiator outlet air. The air guiding slats are positioned so that part of the radiator outlet air is guided to the vehicle outside and a further part of the radiator outlet air can be supplied to the vehicle inside and via a deflecting blade to a wheel brake for cooling. The air guiding slats may also be closed over subregions by means of a facing such that no outlet air can flow through the slats in the subregions.

10 Claims, 2 Drawing Sheets

AIR GUIDING DEVICE

CROSS REFERENCE TO RELATED APPLICATION

This application claims priority under 35 USC 119 to German Patent Appl. No. 10 2010 037 617.5 filed on Sep. 17, 2010, the entire disclosure of which is incorporated herein by reference.

BACKGROUND OF THE INVENTION

1. Field of the Invention

The invention relates to an air guiding device for a motor vehicle.

2. Description of the Related Art

DE 37 11 682 A1 discloses an air guiding device for cooling air for a vehicle brake, in which a fresh air flow that has entered at an inflow cross section of a guiding duct can be supplied to an associated braking device and to a forced ventilation heat exchanger. The cooling air supplied to the braking device is formed substantially by the outlet air flow downstream of the heat exchanger.

It is the object of the invention to provide an air guiding device in a front end part of a motor vehicle, via which an outlet air flow of a cooling unit can be used at the same time to cool a wheel brake.

SUMMARY OF THE INVENTION

The invention relates to an air guiding device that enables radiator outlet air of a radiator unit to be used for cooling a wheel brake or a braking system in a vehicle and that enables the radiator outlet air to be guided upward to the vehicle outside. The air guiding device of the invention has an air guiding duct with an air outlet opening formed in a front end part by a wheel house grille. The wheel house grille is oriented transversely in the vehicle and has vertical air guiding slats positioned to guide the outlet air to the vehicle outside and inside. A deflecting blade is arranged in the wheel house of the vehicle downstream of the wheel house grille and is intended to direct the radiator outlet air toward the wheel brake. The air guiding slats in the wheel house grille and the deflecting blade downstream of the air guiding slats guide part of the outlet air flow to the vehicle inside and guide a further part of the outlet air flow to the vehicle outside.

The wheel house grille preferably has differently positioned air guiding slats from the vehicle inside toward the vehicle outside for the radiator outlet air.

Some of the air guiding slats may be arranged on the vehicle inside and may run parallel to the vehicle longitudinal axis. Other air guiding slats may be positioned more obliquely, i.e. at an angle, and may extend as far as the vehicle outside to guide the radiator outlet air to the outside.

The air guiding slats preferably are positioned so that a part the radiator outlet air can be guided obliquely with respect to the outside via the outer more obliquely positioned air guiding slats, and so that another part of the radiator outlet air can be guided to the vehicle inside and to the air deflecting blade via the more steeply positioned inner air guiding slats. Thus, part of the radiator outlet air is guided obliquely with respect to the vehicle outside via the outer air guiding slats that are positioned obliquely at an angle and the other part of radiator outlet air is guided to the vehicle inside and to the air deflecting blade via the more steeply positioned parallel air guiding arranged on the inside. The highly efficient differently positioned air guiding slats ensure a sufficient supply of air by the radiator unit, formed from the radiator and a fan, and also improve the cooling of the wheel brake. Furthermore, the configuration is also optimum aerodynamically with regard to drag and the lifting effect of the front axle.

The air guiding slats preferably are arranged continuously from the vehicle outside toward the vehicle inside from an oblique position to a steep positioning lying rectilinearly parallel to the vehicle longitudinal axis. A plurality of air guiding slats arranged in the region of the vehicle outside may be designed on the front side with an air guiding edge that is curved in a hook-shaped manner. The air guiding edge is designed to be curved less severely continuously as far as the central region. The air guiding slats in the region of the vehicle inside run rectilinearly and parallel. The specific guiding of outlet air via the different positionings of the air guiding slats in the wheel house grille enables part of the outlet air to be guided directly to the vehicle outside and a further part of the radiator outlet air to be guided parallel to the vehicle longitudinal axis. This part of the radiator outlet air is supplied, with the aid of the deflecting blade, directly to the wheel brakes in the vehicle. As a result, the wheel brake cooling is improved because the outlet air flow can be guided from the inside to the outside in a manner directed specifically to the wheel brake or to the brake disk of the braking system.

The air deflecting blade preferably has an angular, upwardly extending component with a first limb that runs parallel to the vehicle longitudinal axis and a second limb that is bent at right angles to run transverse to the vehicle and toward the wheel brake. These limbs form a means for deflecting the radiator outlet air to the wheel brake. Part of the radiator outlet air supplied to the wheel brake therefore can be supplied directly to the wheel brake and can escape to the side of the vehicle so that ram air cannot occur.

At least one subregion of the wheel house grille may have a facing and may be closed by the facing. Thus, a central subregion of the wheel house grille may be closed, while laterally adjoined subregions may be open. Alternatively, a subregion of the wheel house grille near the outside of the vehicle may be closed, while a subregion on the vehicle inside may be open. This configuration is particularly advantageous for cooling the wheel brakes, since the air guiding duct and wheel house grille form a nozzle-shaped constriction having an outlet cross section that supplies all of the radiator outlet air to the wheel brakes at high speed. The closed subregions of the wheel house grille throttle the mass flow of cooling air in vehicle variants having lower engine capacities or cooling requirements. This reduces the aerodynamic drag and the lifting effect of the front axle.

DETAILED DESCRIPTION OF THE PREFERRED EMBODIMENTS

Figure 1:
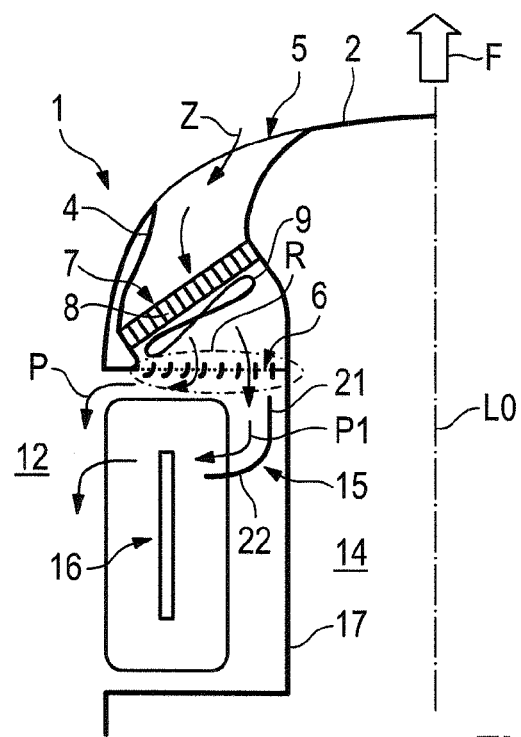
FIG. 1 is a horizontal section through a front end part of a motor vehicle with a radiator unit arranged in an air guiding duct, and a wheel house grille with a deflecting blade arranged downstream.
Figure 2:
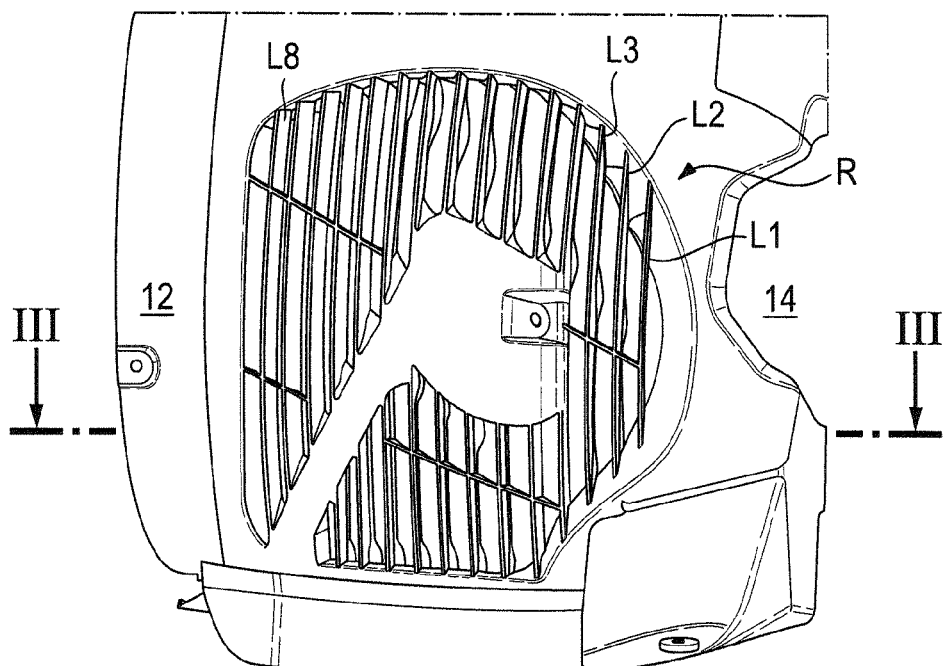
FIG. 2 is a front view of the wheel house grille.

Air guiding devices 1 are arranged in left and right front end parts 2 of a vehicle. Each air guiding device 1 comprises a guiding duct 4 arranged laterally in the front end part 2. The guiding duct 4 has a front inlet opening 5 and a rear outlet opening 6. A cooling unit 7, comprising a radiator 8 and a fan 9, is arranged in the guiding duct 4. The air outlet opening 6 is formed by a wheel house grille R oriented transversely in the vehicle and has vertical air guiding slats L positioned to guide radiator outlet air. The wheel house grille R preferably forms the front wall of the wheel house or is inserted into the front wall.

Fresh air Z enters the front inlet opening 5 and is guided via the guiding duct 4 to the radiator unit 7. Radiator outlet air 11 is output downstream behind the radiator 8 and is guided to the vehicle outside 12 (arrow P) or to the vehicle inside 14 (arrow P1). The radiator outlet air 11 that is guide to the vehicle inside 14 (arrow P1) is directed a deflecting blade 15 in the wheel house 17 to the wheel brake 16 or to the brake disk.

Figure 3:
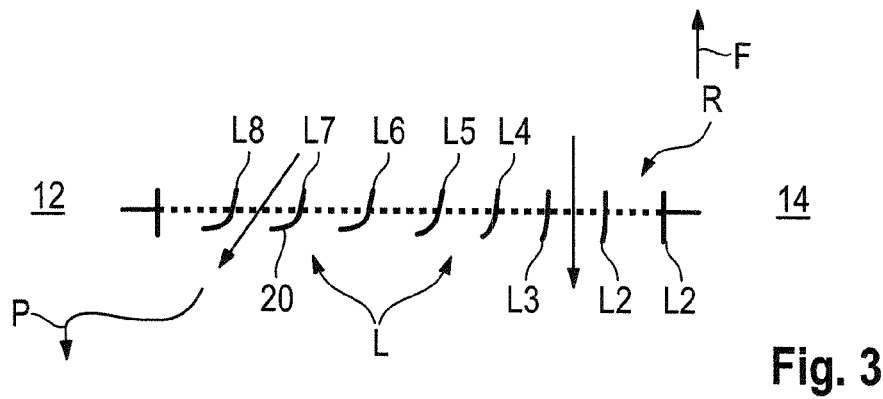
FIG. 3 is a section taken along line III-III in FIG. 2 with differently positioned air guiding slats in the wheel house grille from the vehicle outside toward the vehicle inside.

The air guiding slats L are positioned differently to guide the outlet air in the direction of the vehicle outside 12 and to the vehicle inside 14. Air guiding slats L1 to L3 on the vehicle inside 14 are oriented approximately parallel to the vehicle longitudinal axis Lo. The adjoining air guiding slats L4 to L8 that are positioned more toward the vehicle outside 12 are aligned more obliquely at an angle toward the vehicle outside 12, i.e. they are positioned over an increasing acute angle with respect to the vehicle longitudinal axis Lo so that the outlet air flow 11 can be deflected and flow directly to the vehicle outside 12, as shown in more detail by arrows P in FIGS. 1 and 3.

The outer more obliquely positioned air guiding slats L4 to L8 guide the radiator outlet air obliquely to the vehicle outside 12 and the more steeply positioned inner air guiding slats L1 to L3 guide the radiator outlet air P1 to the vehicle inside 14 and to the air deflecting blade 15. In particular, the air guiding slats L are arranged continuously from the vehicle inside 14 to the vehicle outside 12 in a manner rising more steeply in the wheel house grille R.

The front side of each air guiding slats L4 to L8 preferably has an air guiding edge 20 that is curved in a hook-shape for efficiently deflecting air to the vehicle outside 12. The curvature of the air guiding edge 20 decreases from the outside to the inside.

The air deflecting blade 15 in the wheel house 17 of each side of the vehicle preferably has an angular, upwardly extending component with first and second limbs 21 and 22. The first limb 21 runs parallel to the vehicle longitudinal axis Lo. The second limb 22 is bent at right angles to the first limb 21 and extends transverse to the vehicle longitudinal axis Lo toward the wheel brake 16. The two limbs 21 and 22 form a means for deflecting the air to the wheel brake 16.

As shown in FIG. 1, fresh air Z that flows into the front inlet opening 5 of the guiding duct 4 counter to the direction of travel F passes through the radiator 8 and is guided through the wheel house grille R arranged downstream. The differently positioned air guiding slats L1 to L8 control the flow of radiator outlet air 11. More particularly, the air guiding slats L1 to L3 deflect part of the radiator outlet air 11 emerging from the radiator 8 to the deflecting blade 15 in the wheel house 17 and from there to the wheel brake 16, and the radiator outlet air P1 then is guided to the vehicle outside 12. The air guiding slats L4 to L8 are positioned obliquely or have a curved air guiding edge 20 and deflect a further part of the radiator outlet air 11 directly to the vehicle outside 12, as shown in FIG. 1 by the arrow P.

Figure 4:
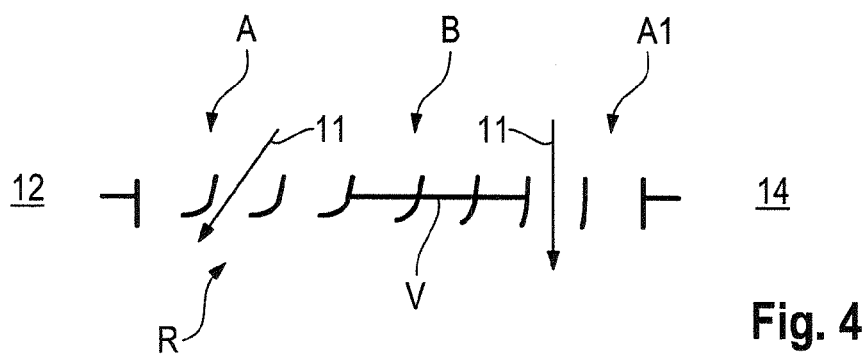
FIG. 4 is a section through the wheel house grille with the wheel house grille closed in a central subregion.
Figure 5:
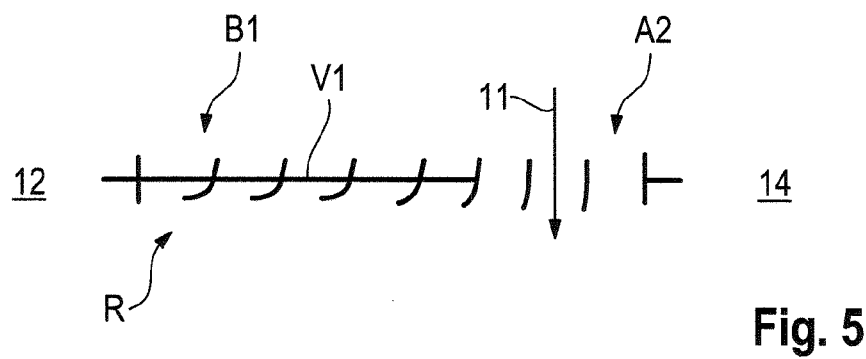
FIG. 5 is a section through the wheel house grille with the wheel house grille closed on the vehicle outside.

According to a further embodiment, subregions B, B1 of the wheel house grille R are closed or are provided with a facing V, V1. Thus, in the embodiment of FIG. 4, a central subregion B is closed via the facing V, but is adjoined by open lateral subregions A, A1 via which the outlet air 11 can flow off. FIG. 5 shows a further embodiment in which a subregion B1 that is arranged on the vehicle outside 12 is closed via the facing V1, but is adjoined by an open subregion A2 on the vehicle inside 14.

The invention has been described and illustrated with respect to one preferred embodiment. However, it is understood that various changes can be made without departing from the scope of the invention as defined by the appended claims.

The left front of the vehicle is illustrated as having the air guiding device. However, a substantially symmetrical air guiding device typically will be provided at the right front as well

What is claimed is:

1. An air guiding device in a front end part of a motor vehicle for guiding fresh air, the air guiding device comprising: an air guiding duct having a front air inlet opening, a radiator in the guiding duct rearward of the inlet opening for receiving fresh air from the inlet opening and an air outlet opening downstream of the radiator and receiving radiator outlet, the air outlet opening including a wheel house grille that is oriented transversely in the vehicle and has vertically oriented air guiding slats disposed and configured to guide a first part of the radiator outlet air to a vehicle outside area and a second part of the radiator outlet air to a vehicle inside area and toward an air deflecting blade downstream of the wheel house grille, the air deflecting blade being configured to guide the second part of the radiator outlet air toward a wheel brake in the wheel house for cooling the wheel brake, wherein the air guiding slats include a first plurality of air guiding slats disposed on the vehicle inside and running substantially parallel to a vehicle longitudinal axis, and a second plurality of air guiding slats extending from the first plurality of air guiding slats to the vehicle outside, the second plurality of air guiding slats being aligned oblique to the vehicle longitudinal axis for guiding the radiator outlet air to the outside.

2. The air guiding device of claim 1, wherein the air guiding slats of the wheel house grille has different respective orientations from the vehicle inside to the vehicle outside.

3. The air guiding device of claim 1, wherein the first plurality of air guiding slats are aligned to guide the second part of the radiator outlet air to the air deflecting blade.

4. An air guiding device in a front end part of a motor vehicle for guiding fresh air, the air guiding device comprising: an air guiding duct having a front air inlet opening, a radiator in the guiding duct rearward of the inlet opening for receiving fresh air from the inlet opening and an air outlet opening downstream of the radiator and receiving radiator outlet, the air outlet opening including a wheel house grille that is oriented transversely in the vehicle and has vertically oriented air guiding slats disposed and configured to guide a first part of the radiator outlet air to a vehicle outside area and a second part of the radiator outlet air to a vehicle inside area and toward an air deflecting blade downstream of the wheel house grille, the air deflecting blade being configured to guide the second part of the radiator outlet air toward a wheel brake in the wheel house for cooling the wheel brake, wherein the air guiding slats are arranged continuously from the vehicle outside to the vehicle inside from an oblique position to a steeper and rectilinear positioning lying parallel to the vehicle longitudinal axis.

5. An air guiding device of in a front end part of a motor vehicle for guiding fresh air, the air guiding device comprising: an air guiding duct having a front air inlet opening, a radiator in the guiding duct rearward of the inlet opening for receiving fresh air from the inlet opening and an air outlet opening downstream of the radiator and receiving radiator outlet, the air outlet opening including a wheel house grille that is oriented transversely in the vehicle and has vertically oriented air guiding slats disposed and configured to guide a first part of the radiator outlet air to a vehicle outside area and a second part of the radiator outlet air to a vehicle inside area and toward an air deflecting blade downstream of the wheel house grille, the air deflecting blade being configured to guide the second part of the radiator outlet air toward a wheel brake in the wheel house for cooling the wheel brake, wherein a plurality of the air guiding slats in proximity to the vehicle outside have an air guiding edge formed on a front side, the air guiding edges being curved in a hook shape, the air guiding edges being curved less severely at positions closer to a central region between the vehicle outside and the vehicle inside, the air guiding slats between the central region and the vehicle inside running rectilinearly and parallel to the vehicle longitudinal axis.

6. An air guiding device in a front end part of a motor vehicle for guiding fresh air, the air guiding device comprising: an air guiding duct having a front air inlet opening, a radiator in the guiding duct rearward of the inlet opening for receiving fresh air from the inlet opening and an air outlet opening downstream of the radiator and receiving radiator outlet, the air outlet opening including a wheel house grille that is oriented transversely in the vehicle and has vertically oriented air guiding slats disposed and configured to guide a first part of the radiator outlet air to a vehicle outside area and a second part of the radiator outlet air to a vehicle inside area and toward an air deflecting blade downstream of the wheel house grille, the air deflecting blade being configured to guide the second part of the radiator outlet air toward a wheel brake in the wheel house for cooling the wheel brake, wherein the air deflecting blade is an upwardly extending component with a first limb that runs substantially parallel to the vehicle longitudinal axis and a second limb bent at a substantially right angle from the first limb, the second limb running substantially transversely to the vehicle longitudinal axis and is directed toward the wheel brake for deflecting the second part of the radiator outlet air to the wheel brake.

7. An air guiding device of in a front end part of a motor vehicle for guiding fresh air, the air quidinq device comprising: an air guiding duct having a front air inlet opening, a radiator in the quidinq duct rearward of the inlet opening for receiving fresh air from the inlet opening and an air outlet opening downstream of the radiator and receiving radiator outlet, the air outlet opening including a wheel house grille that is oriented transversely in the vehicle and has vertically oriented air guiding slats disposed and configured to guide a first part of the radiator outlet air to a vehicle outside area and a second part of the radiator outlet air to a vehicle inside area and toward an air deflecting blade downstream of the wheel house grille, the air deflecting blade being configured to guide the second part of the radiator outlet air toward a wheel brake in the wheel house for cooling the wheel brake, wherein the wheel house grille is closed across at least one first subregion by a facing and open across at least one second subregion adjoining the first subregion.

8. The air guiding device of claim 7, wherein the air guiding slats include a first plurality of air guiding slats disposed on the vehicle inside and running substantially parallel to a vehicle longitudinal axis, and a second plurality of air guiding slats extending from the first plurality of air guiding slats to the vehicle outside, the second plurality of air guiding slats being aligned oblique to the vehicle longitudinal axis for guiding the radiator outlet air to the outside.

9. The air guiding device of claim 7, wherein the first subregion is in a central part of the wheel house grille and the at least one second subregion comprises two second subregions disposed on opposite respective sides of the first subregion and toward the vehicle inside and the vehicle outside respectively.

10. The air guiding device of claim 7, wherein the first subregion of the wheel house grille is in proximity to the vehicle outside and is closed via the facing, and the second subregion of the wheel house grille is in proximity to the vehicle inside and is open for letting outlet air through.

* * * * *